United States Patent
Yue et al.

(10) Patent No.: US 11,604,560 B2
(45) Date of Patent: *Mar. 14, 2023

(54) APPLICATION ASSOCIATION PROCESSING METHOD AND APPARATUS

(71) Applicant: Huawei Device Co., Ltd., Guangdong (CN)

(72) Inventors: Yi Yue, Shanghai (CN); Peng Qian, Shanghai (CN)

(73) Assignee: Huawei Device Co., Ltd., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,839

(22) Filed: Jan. 28, 2022

(65) Prior Publication Data

US 2022/0221979 A1   Jul. 14, 2022

Related U.S. Application Data

(63) Continuation of application No. 14/901,557, filed as application No. PCT/CN2014/083512 on Aug. 1, 2014, now Pat. No. 11,269,482.

(30) Foreign Application Priority Data

Aug. 28, 2013   (CN) .......................... 201310382155.1

(51) Int. Cl.
   *G06F 3/04817*   (2022.01)
   *G06F 3/0488*    (2022.01)
   (Continued)

(52) U.S. Cl.
   CPC .......... *G06F 3/04817* (2013.01); *G06F 3/017* (2013.01); *G06F 3/0488* (2013.01); *G06F 3/04847* (2013.01); *G06F 3/04883* (2013.01)

(58) Field of Classification Search
   CPC .. G06F 3/017; G06F 3/04817; G06F 3/04847; G06F 3/0488; G06F 3/04883
   See application file for complete search history.

(56) References Cited

U.S. PATENT DOCUMENTS

| | | | |
|---|---|---|---|
| 2007/0204237 | A1 | 8/2007 | Guo et al. |
| 2008/0215976 | A1 | 9/2008 | Bierner et al. |

(Continued)

FOREIGN PATENT DOCUMENTS

| | | | |
|---|---|---|---|
| CN | 101345941 | A | 1/2009 |
| CN | 101527745 | A | 9/2009 |

(Continued)

OTHER PUBLICATIONS

Leonhard, "Windows 7 All-In-One For Dummies", copyright 2009, published by Wiley Publishing Inc. http://www.cloud.stuart-martin.co.uk/PUBLIC/Windows-%207-%20All-In-One-For-Dummies.pdf (Year: 2009).

(Continued)

*Primary Examiner* — Seth A Silverman
(74) *Attorney, Agent, or Firm* — Leydig, Voit & Mayer, Ltd.

(57) ABSTRACT

Embodiments of the present invention provide an application association processing method and apparatus. The method includes: detecting a first operation instruction entered by a user; and when it is determined that the first operation instruction is to perform, by the user, a first preset operation on first content displayed on a display interface, displaying prompt information of second content associated with the first content, where the first preset operation is an operation gesture preset by the user, and the prompt information is used to inform the user that an association relationship exists between the first content and the second content.

20 Claims, 4 Drawing Sheets

An application association processing apparatus detects a first operation instruction entered by a user — S101

When it is determined that the first operation instruction is to perform, by the user, a first preset operation on first content displayed on a display interface, the application association processing apparatus displays prompt information of second content associated with the first content — S102

(51) Int. Cl.
*G06F 3/04883* (2022.01)
*G06F 3/01* (2006.01)
*G06F 3/04847* (2022.01)

(56) References Cited

U.S. PATENT DOCUMENTS

| | | |
|---|---|---|
| 2009/0058821 A1 | 3/2009 | Chaudhri et al. |
| 2009/0228820 A1 | 9/2009 | Kim et al. |
| 2010/0013780 A1 | 1/2010 | Ikeda et al. |
| 2010/0299638 A1 | 11/2010 | Choi |
| 2011/0202853 A1 | 8/2011 | Mujkic |
| 2011/0265045 A1 | 10/2011 | Hsieh |
| 2012/0030623 A1 | 2/2012 | Hoellwarth |
| 2012/0150446 A1 | 6/2012 | Chang et al. |
| 2014/0068516 A1 | 3/2014 | Escobedo et al. |
| 2015/0020036 A1 | 1/2015 | Kim et al. |

FOREIGN PATENT DOCUMENTS

| | | |
|---|---|---|
| CN | 101836182 A | 9/2010 |
| CN | 102065178 A | 5/2011 |
| CN | 102799348 A | 11/2012 |
| CN | 102819345 A | 12/2012 |
| CN | 1030675 A | 4/2013 |
| CN | 103019662 A | 4/2013 |
| CN | 103135969 A | 6/2013 |
| CN | 103139371 A | 6/2013 |
| CN | 103218133 A | 7/2013 |
| CN | 103235781 A | 8/2013 |
| CN | 103246398 A | 8/2013 |
| CN | 103257792 A | 8/2013 |
| CN | 103455278 A | 12/2013 |
| EP | 2568372 A1 | 3/2013 |
| EP | 2600235 A2 | 6/2013 |
| TW | 201312439 A | 3/2013 |
| WO | 2012170446 A2 | 12/2012 |

OTHER PUBLICATIONS

Sirianni, "GO SMS Gives Handcent A Run For Its Money", published: Mar. 17, 2011, talkandroid.com, https://www.talkandroid.com/33266-go-sms-gives-handcent-a-run-for-its-money/ (Year: 2011).

Microsoft et al. "Where does IE8 store the Icon files for the shortcuts it saves to the desktop?", response published: Feb. 7, 2010, Microsoft Community, https://answers.microsoft.com/en-us/ie/forum/ie8-windows_other/where-does-ie8-store-the-icon-files-for-the/65943f30-60bf-4f65-9d65-02cd27c3c101 (Year: 2010).

Brink, "Windows 7: Open With—Change Default Program", published: Jun. 5, 2009, Windows Seven Forums, https://www.sevenforums.com/tutorials/12196-open-change-default-program.html (Year: 2009).

APPLICATION ASSOCIATION PROCESSING METHOD AND APPARATUS

CROSS-REFERENCE TO RELATED APPLICATION

This application is a continuation of U.S. patent application Ser. No. 14/901,557, filed on Dec. 28, 2015, which is a National Stage of International Patent Application No. PCT/CN2014/083512, filed on Aug. 1, 2014. The International Patent application claims priority to Chinese Patent Application No. 201310382155.1, filed on Aug. 28, 2013. All of the aforementioned patent applications are hereby incorporated by reference in their entireties.

TECHNICAL FIELD

The present invention relates to communications technologies, and in particular, to an application association processing method and apparatus.

BACKGROUND

With the innovation of communications technologies, touchscreen terminal devices such as mobile phones and tablets also tend to develop rapidly. Researches show that over ten thousand new devices are activated worldwide on a daily basis; therefore, applications used on these devices are increasingly diversified and improved as user demands become different.

Applications can help a user know about news events, capture a note, engage in socialization, listen to music, have entertainment, play games, and the like at any time. To meet a user demand, functions provided by current applications are increasingly improved and diversified, and currently, many applications can all provide two forms: a widget and an application icon for a user to select and use. An application icon is generally a main entry to enter the application, and a widget can display some functions of the application, for example, the widget can make, by using a visual window, it convenient for a user to intuitively know about related functions provided by the application. For example, for a weather forecast application, a main interface of the weather forecast can be entered by using an application icon, and a widget can display information such as a temperature and a wind force today on a desktop.

However, as functions of an application become increasingly powerful, the application includes increasing widgets, and user operation complexity is increased.

SUMMARY

Embodiments of the present invention provide an application association processing method and apparatus, which can reduce user operation complexity.

According to a first aspect, an embodiment of the present invention provides an application association processing method, including:

detecting a first operation instruction entered by a user; and when it is determined that the first operation instruction is to perform, by the user, a first preset operation on first content displayed on a display interface, displaying prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs.

In a first possible implementation manner, according to the first aspect, before the detecting a first operation instruction entered by a user, the method further includes:

detecting a second operation instruction entered by the user; and when the second operation instruction is to perform, by the user, a second preset operation on the first content displayed on the display interface, switching the displayed first content to an editable state, where the second preset operation is an operation gesture preset for switching the first content to the editable state, where the detecting a first operation instruction entered by a user includes:

detecting the first operation instruction entered by the user for the first content in the editable state.

In a second possible implementation manner, with reference to the first aspect and the first possible implementation manner, the first preset operation includes:

a sliding operation within a preset area surrounding the first content.

In a third possible implementation manner, with reference to the first aspect, the first possible implementation manner, and the second possible implementation manner, the displaying prompt information of second content associated with the first content includes:

determining, according to an application package file, the second content that has the association relationship with the first content, and displaying the prompt information of the second content, where the application package file is a source file of the first content and the second content.

In a fourth possible implementation manner, with reference to the first aspect, the first possible implementation manner, the second possible implementation manner, and the third possible implementation manner, the displaying prompt information of second content associated with the first content includes:

displaying, in a form of a floating window, the prompt information of the second content associated with the first content.

In a fifth possible implementation manner, with reference to the first aspect, the first possible implementation manner, the second possible implementation manner, the third possible implementation manner, and the fourth possible implementation manner, after the displaying prompt information of second content associated with the first content, the method further includes:

detecting a third operation instruction entered by the user; and when the third operation instruction is to perform, by the user, a third preset operation on the prompt information of the second content, displaying the second content on the display interface, where the third preset operation is an operation gesture preset for displaying the second content.

According to a second aspect, an embodiment of the present invention provides an application association processing apparatus, including:

a first detection unit, configured to detect a first operation instruction entered by a user; and a first processing unit, configured to: when it is determined that the first operation instruction is to perform, by the user, a first preset operation on first content displayed on a display interface, display prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs.

In a first possible implementation manner, according to the second aspect, the apparatus further includes:

a second detection unit, configured to: before the first detection unit detects the first operation instruction entered by the user, detect a second operation instruction entered by the user; and a second processing unit, configured to: when the second operation instruction is to perform, by the user, a second preset operation on the first content displayed on the display interface, switch the displayed first content to an editable state, where the second preset operation is an operation gesture preset for switching the first content to the editable state, where the first detection unit is specifically configured to detect the first operation instruction entered by the user for the first content in the editable state.

In a second possible implementation manner, with reference to the second aspect and the first possible implementation manner, the second preset operation includes: a sliding operation within a preset area surrounding the first content.

In a third possible implementation manner, with reference to the second aspect, the first possible implementation manner, and the second possible implementation manner, the first preset operation includes:

The first processing unit is specifically configured to: if it is determined that the first operation instruction is to perform, by the user, the first preset operation on the first content displayed on the display interface, determine, according to an application package file, the second content that has the association relationship with the first content, and display the prompt information of the second content, where the application package file is a source file of the first content and the second content.

In a fourth possible implementation manner, with reference to the second aspect, the first possible implementation manner, the second possible implementation manner, and the third possible implementation manner, the first processing unit is specifically configured to display, in a form of a floating window, the prompt information of the second content associated with the first content.

In a fifth possible implementation manner, with reference to the second aspect, the first possible implementation manner, the second possible implementation manner, the third possible implementation manner, and the fourth possible implementation manner, a third detection unit, configured to detect a third operation instruction entered by the user; and a third processing unit, configured to: when it is determined that the third operation instruction is to perform, by the user, a third preset operation on the displayed prompt information of the second content, display the second content on the display interface, where the third preset operation is an operation gesture preset for displaying the second content.

The embodiments of the present invention provide an application association processing method and apparatus. The application association processing apparatus detects a first operation instruction entered by a user; and when it is determined that the first operation instruction is to perform, by the user, a first preset operation on first content displayed on a display interface, displays prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs. In this way, an association between an application icon and a widget is indicated, and prompt information is displayed, so that a user conveniently knows an association relationship between the application icon and the widget, and the user performs a further operation according to the prompt information, thereby reducing user operation complexity.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The present invention is applicable to a touchscreen apparatus, and can also be used in other apparatuses that have a touchscreen function and can have an application installed therein. The embodiments of the present invention use an example in which an application association processing apparatus is a touchscreen apparatus for description, but are not limited thereto.

Figure 1:
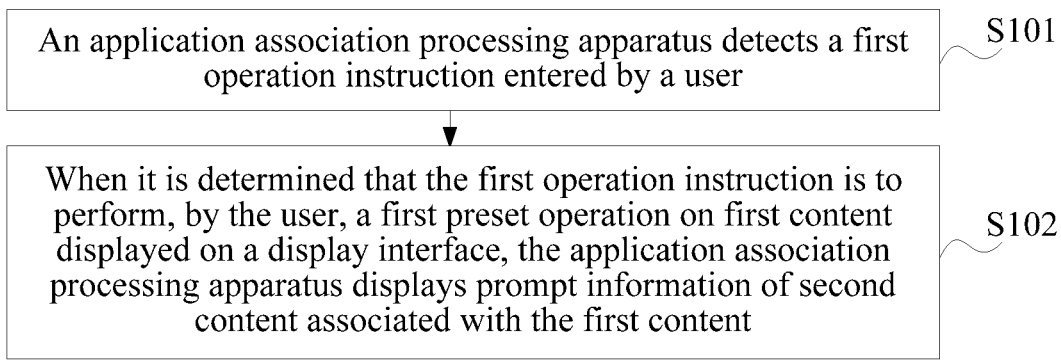
FIG. 1 is a flowchart of an embodiment of an application association processing method according to the present invention.

FIG. 1 is a flowchart of an embodiment of an application association processing method according to the present invention. As shown in FIG. 1, the method includes:

S101: An application association processing apparatus detects a first operation instruction entered by a user.

For example, a touchscreen apparatus detects a sliding operation instruction entered by a user. For example, the touchscreen apparatus may determine a specific implementation form of the first operation instruction by using a position change of a touch point. For example, the first operation instruction is a curved sliding gesture or a gesture of quickly taping for multiple times, and the first operation instruction may be detected according to a moving track or a moving manner of the touch point, where the touch point is formed on a touchscreen during a touch operation of the user by using thermal capacitance of a touching body or a falling point after pressing.

S102: When it is determined that the first operation instruction is to perform, by the user, a first preset operation on first content displayed on a display interface, the application association processing apparatus displays prompt information of second content associated with the first content.

For example, the first preset operation is an operation gesture preset by the user, and the prompt information is used to inform the user that an association relationship exists between the first content and the second content. The first content is an application icon, and the second content is an icon of at least one widget included in an application corresponding to the application icon; or the first content is an icon of a widget, and the second content is an icon of an application to which the widget belongs.

Further, the first preset operation may be a sliding operation within a preset area surrounding the first content. The sliding operation is an operation that uses, as a start point, a position at which the first content is located; or the sliding operation is an operation that uses, as a fixed point, a position at which the first content is located, and uses a preset area surrounding the first content as a sliding area.

For example, the application association processing apparatus may preset a first preset operation; and if the first operation instruction of the user is the same as the first preset operation, it may be determined that the first operation instruction is input by the user for the first content displayed on the display interface, and an objective of the first operation instruction is that the application association processing apparatus displays the prompt information of the second content associated with the first content.

Further, the first preset operation may be a sliding operation within the preset area surrounding the first content. For example, during a sliding operation, the application association processing apparatus can detect multiple touch points; and start points of these touch points may be all at the position of the first content, and subsequently, a finger leaves the position of the first content and continues to move within the preset area; or one fixed point in these touch points is at the position of the first content, and other moving points are at any positions within the preset area surrounding the first content, and a finger moves within the preset area starting from the any positions.

For example, an area that uses the first content as a geometric center and whose covering radius outward is 4 cm to 6 cm is the preset area, within the area starting from the first content, the user makes a zoom-in gesture within the area by using two fingers, and the application association processing apparatus detects that a distance between the two touch points becomes longer, and the first preset operation is the operation of the user; in this case, the application association processing apparatus may determine that the first operation instruction is specific to the first content, and request to display the prompt information of the second content associated with the first content. If the first content is an application icon, prompt information of icons of all widgets included in an application corresponding to the application icon is displayed on the screen, for example, a floating window of the screen; or if the first content is an icon of a widget, prompt information of an icon of an application to which the widget belongs is displayed on the screen, for example, a floating window of the screen.

For another example, it is determined that an area that uses the first content as a geometric center and that covers all ranges of the touchscreen outward is the preset area, the user performs an operation within the area by using three fingers, where one finger is always on the first content, and the other two fingers make a zoom-in gesture within the area, and the application association processing apparatus detects that one fixed point is on the first content and a distance between other two sliding touch points becomes longer, and the first preset operation is the operation of the user; in this case, the application association processing apparatus may determine that the first operation instruction is specific to the first content, and may further determine that the first operation instruction requests to display the prompt information of the second content associated with the first content. If the first content is an application icon, prompt information of icons of all widgets included in an application corresponding to the application icon is displayed on the screen, for example, a floating window of the screen; or if the first content is an icon of a widget, prompt information of an icon of an application to which the widget belongs is displayed on the screen, for example, a floating window of the screen.

It should be noted that the first preset operation and the preset area are both used as an example for description, but do not constitute any limitation, and another operation gesture and different preset area settings all fall within the protection scope. For example, the another operation gesture is an operation of shortening a distance by using two fingers, or an operation of pressing and holding by using one finger, and shortening a distance by using other multiple fingers.

It should be noted that a widget encapsulates data and a method. A widget is a basic visual component block and is included in an application, and each widget controls partial data processed by the application and an interactive operation related to the data. For example, for a weather forecast application, a widget may be a visual window for a temperature today, another widget may be a visual window for air quality, wearing reminding, and a high temperature or rainstorm warning, still another widget may be a visual window for a current room temperature, and the like. An icon of the widget may be a thumbnail, a partial screenshot, or the like of the visual window, or may be a framework icon of the widget.

However, an application icon is an entry to access the application to acquire all functions of the application, and may be considered as a shortcut that is commonly referred to as. By using the method provided by this embodiment, when a widget and an application icon need to be switched, the user may select, by using a correspondence, which has been determined by the application association processing apparatus, between a widget and an application icon, for example, one application icon corresponds to several widgets, a widget or an application icon provided by the application association processing apparatus.

This embodiment of the present invention provides an application association processing method. The application association processing apparatus detects a first operation instruction entered by a user; and when it is determined that the first operation instruction is to perform, by the user, a first preset operation on first content displayed on a display interface, displays prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs. In this way, an association between an application icon and a widget is indicated, and prompt information is displayed, so that a user conveniently knows an association relationship between the application icon and the widget, and the user performs a further operation according to the prompt information, thereby reducing user operation complexity.

Figure 2:
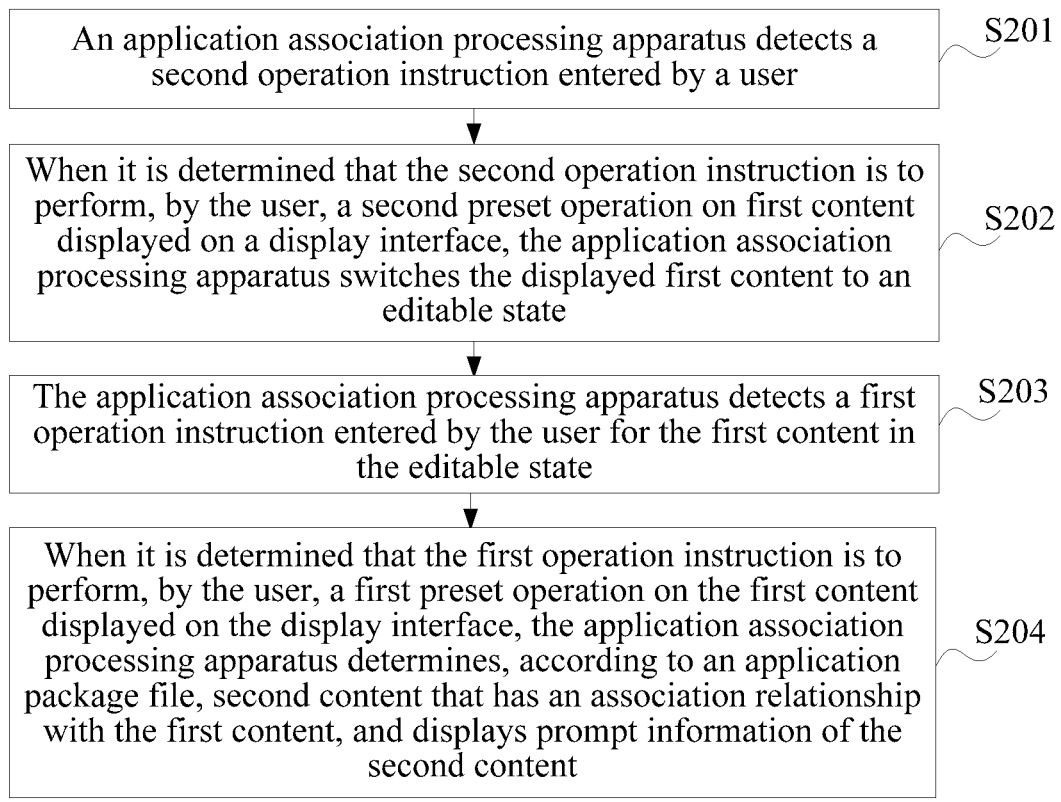
FIG. 2 is a flowchart of an embodiment of another application association processing method according to the present invention.

FIG. 2 is a flowchart of an embodiment of another application association processing method according to the present invention. As shown in FIG. 2, the method includes:

S201: An application association processing apparatus detects a second operation instruction entered by a user.

S202: When it is determined that the second operation instruction is to perform, by the user, a second preset operation on first content displayed on a display interface, the application association processing apparatus switches the displayed first content to an editable state.

The second preset operation is an operation gesture preset for switching the first content to the editable state. For example, the second preset operation may be a pressing operation exceeding preset duration. For example, the user presses a widget icon, a widget, or an application icon for more than three seconds, and all applications on the page on the application association processing apparatus enter an editable mode, or only the widget icon, the widget, or the application icon enters an editable mode. In this embodiment, an example in which there is only the widget icon, the widget, or the application icon is used for description, but does not constitute any limitation.

The editable mode refers to that the widget icon, the widget, or the application icon can be deleted or moved, or may merely be a premode for searching for associated second content in this embodiment, and the editable state may specifically be a capturing state, that is, an icon enters a floating state after being pressed for a long time.

S203: The application association processing apparatus detects a first operation instruction entered by the user for the first content in the editable state.

It should be noted that the first operation instruction that is detected by the application association processing apparatus when the first content is in the editable state is specific to the first content.

S204: When it is determined that the first operation instruction is to perform, by the user, a first preset operation on the first content displayed on the display interface, the application association processing apparatus determines, according to an application package file, second content that has an association relationship with the first content, and displays prompt information of the second content.

The first content is an application icon, and the second content is an icon of at least one widget included in an application corresponding to the application icon; or the first content is an icon of a widget, and the second content is an icon of an application to which the widget belongs. The application package file is a source file of the first content and the second content, for example, both the first content and the second content run on the application association processing apparatus after the application package file is decompressed and installed.

It should be noted that the first preset operation may be a sliding operation within a preset area surrounding the first content. For example, a start point of a sliding operation is at a position of the first content; or a fixed point of a sliding operation is at a position of the first content, and a sliding point is at any position within the preset area surrounding the first content. These operations have been described in detail in the foregoing embodiment, and details are not described herein again. It should be noted that, if the user presses a widget icon, a widget, or an application icon for more than preset duration, all applications on the page on the application association processing apparatus enter the editable mode. Preferably, the first preset operation is set to be similar to the foregoing two types of operations; in this way, the application association processing apparatus can conveniently determine the first content on which an operation needs to be performed. In a case in which the user presses a widget icon, a widget, or an application icon for more than preset duration, and only the first content enters the editable mode, the first preset operation may further be the following several operation manners.

For example, the user performs a click operation, for example, one finger slides within a preset area, where the preset area is described by using an example in the foregoing embodiment and is not described herein again. If a touchscreen detects that a position of a touch point formed by the finger changes, for example, a value of a horizontal coordinate and/or a value of a vertical coordinate of the touch point changes, determines, according to the application package file, the second content that has the association relationship with the first content, and displays the prompt information of the second content. The first preset operation may also be set according to a position of the single point, for example, a sliding operation is performed on the first content along a diagonal direction from the single point.

Alternatively, the user performs a zoom-in or zoom-out operation by using at least two fingers; if the application association processing apparatus detects that positions of at least two touch points formed by this operation change, the application association processing apparatus continuously detects a distance between two neighboring touch points; and if the distance increases, or the distance decreases, the application association processing apparatus determines, according to the application package file, the second content that has the association relationship with the first content, and displays the prompt information of the second content.

Further, if the user slides within a preset area by using at least three fingers, changes of positions of at least three touch points are detected, a size of an area surrounded by all the touch points is determined according to the changes of the positions, and if the size increases or decreases, the second content that has the association relationship with the first content is determined according to the application package file, and the prompt information of the second content is displayed.

It should be noted that, it may be defined that the foregoing operations are performed within preset duration, for example, if the second operation instruction detected within 3 seconds conforms to one of the foregoing second preset operations, the prompt information of the second content associated with the first content may be displayed.

Further, the application association processing apparatus may display, in a form of a floating window, the prompt information of the second content associated with the first content.

It should be noted that, in addition to determining the second content that has the association relationship with the first content according to the application package file, it may be further determined, according to buffered information about the first content and buffered application information corresponding to the second content, such as a widget attribute and an application attribute, or in another manner, whether the first content is associated with the second content.

This embodiment of the present invention provides an application association processing method. The application association processing apparatus detects a first operation instruction entered by a user; and when it is determined that the first operation instruction is to perform, by the user, a first preset operation on first content displayed on a display interface, displays prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs. In this way, an association between an application icon and a widget is indicated, and prompt information is displayed, so that a user conveniently knows an association relationship between the application icon and the widget, and the user performs a further operation according to the prompt information, thereby reducing user operation complexity.

Figure 3:
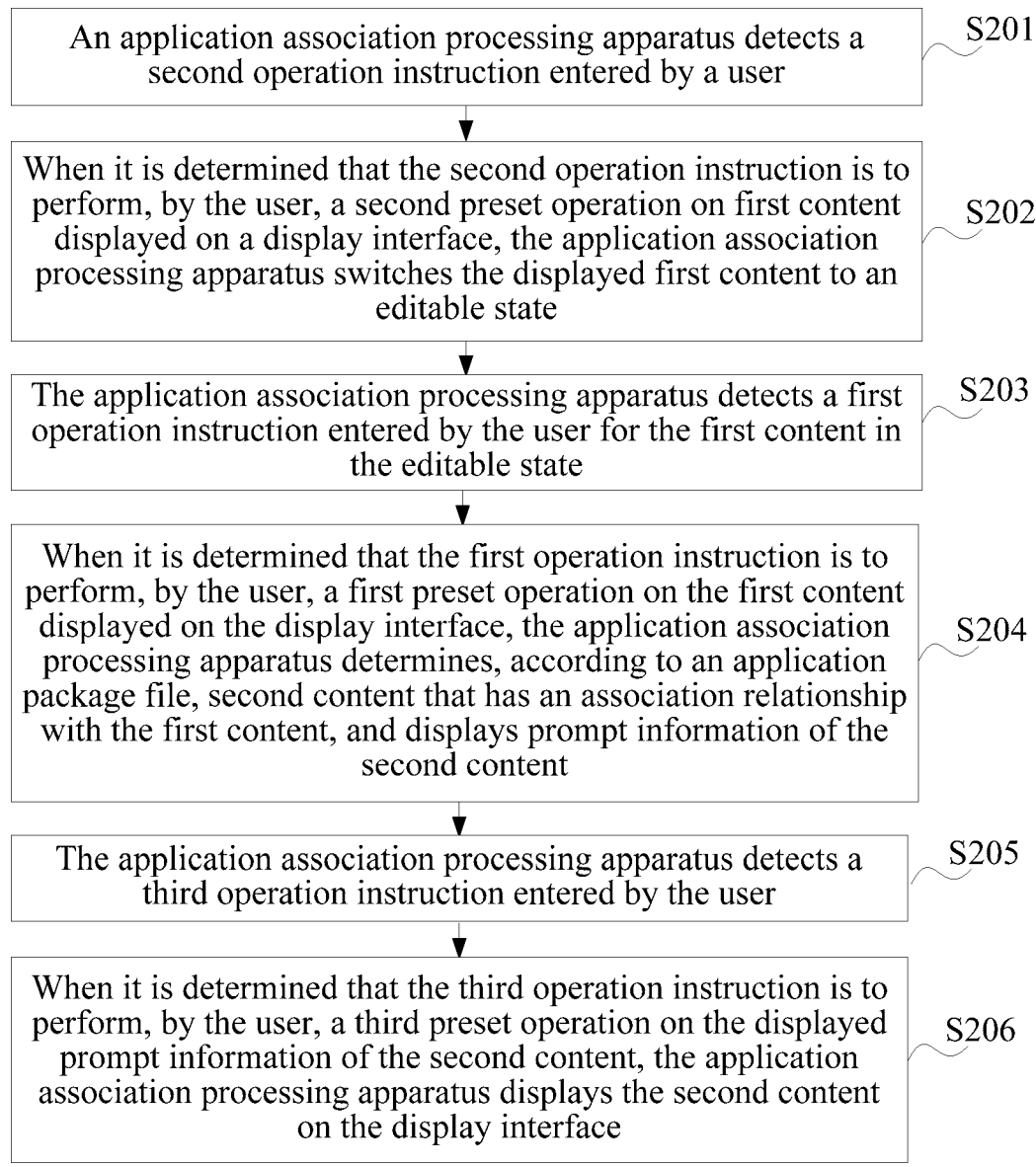
FIG. 3 is a flowchart of an embodiment of still another application association processing method according to the present invention.

FIG. 3 is a flowchart of an embodiment of still another application association processing method according to the present invention. As shown in FIG. 3, after S204, the method further includes:

S205: The application association processing apparatus detects a third operation instruction entered by the user.

S206: When it is determined that the third operation instruction is to perform, by the user, a third preset operation on the displayed prompt information of the second content, the application association processing apparatus displays the second content on the display interface.

Further, the third preset operation is an operation gesture preset for displaying the second content. For example, the third preset operation may be at least one tap operation on the second content, for example, a tap or double-tap operation or the like performed on a widget icon or an application icon on a floating window.

It should be noted that after the user executes the third operation instruction, the application association processing apparatus displays the second content on the interface. If the second content is an application icon, the application icon is displayed on a desktop, or an application program corresponding to the application icon is entered. If the second content is an icon of a widget, a visual window of the widget may be displayed on a desktop.

This embodiment of the present invention provides an application association processing method. The application association processing apparatus detects a first operation instruction entered by a user; and when it is determined that the first operation instruction is to perform, by the user, a first preset operation on first content displayed on a display interface, displays prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs. In this way, an association between an application icon and a widget is indicated, and prompt information is displayed, so that a user conveniently knows an association relationship between the application icon and the widget, and the user performs a further operation according to the prompt information, thereby reducing user operation complexity.

Figure 4:
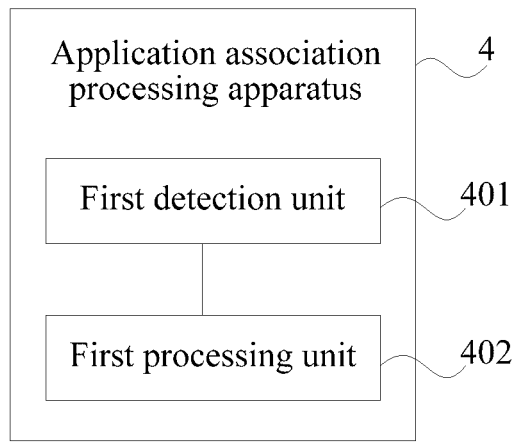
FIG. 4 is a schematic structural diagram of an embodiment of an application association processing apparatus according to the present invention.

FIG. 4 is a schematic structural diagram of an embodiment of an application association processing apparatus according to the present invention. As shown in FIG. 4, the application association processing apparatus 4 includes:

a first detection unit 401, configured to detect a first operation instruction entered by a user; and a first processing unit 402, configured to: when it is determined that the first operation instruction is to perform, by the user, a first preset operation on first content displayed on a display interface, display prompt information of second content associated with the first content, where the first preset operation is an operation gesture preset by the user, and the prompt information is used to inform the user that an association relationship exists between the first content and the second content, where the first content is an application icon, and the second content is an icon of at least one widget included in an application corresponding to the application icon; or the first content is a widget icon, and the second content is an icon of an application to which the widget belongs.

Further, the first processing unit 402 may be configured to display, in a form of a floating window, the prompt information of the second content associated with the first content.

For example, the first preset operation may be a sliding operation within a preset area surrounding the first content. The sliding operation is an operation that uses, as a start point, a position at which the first content is located; or the sliding operation is an operation that uses, as a fixed point, a position at which the first content is located, and uses a preset area surrounding the first content as a sliding area.

It should be noted that the first preset operation has been described by using an example in the foregoing embodiments, and details are not described herein again.

Figure 5:
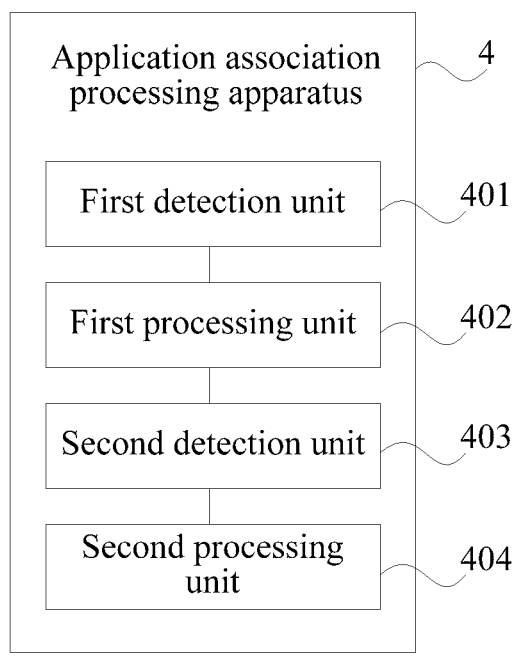
FIG. 5 is a schematic structural diagram of an embodiment of another application association processing apparatus according to the present invention.

Further, FIG. 5 is a schematic structural diagram of an embodiment of another application association processing apparatus according to the present invention. As shown in FIG. 5, the application association processing apparatus 4 further includes:

a second detection unit 403, configured to: before the first detection unit 401 detects the first operation instruction entered by the user, detect a second operation instruction entered by the user; and a second processing unit 404, configured to: when the second operation instruction is to perform, by the user, a second preset operation on the first content displayed on the display interface, switch the displayed first content to an editable state, where the second preset operation is an operation gesture preset for switching the first content to the editable state.

The second preset operation may be a pressing operation exceeding preset duration.

It should be noted that the second preset operation has been described by using an example in the foregoing embodiments, and details are not described herein again.

In this case, the first detection unit 401 may be configured to detect the first operation instruction entered by the user for the first content in the editable state, so that, if it is determined that the first operation instruction is to perform, by the user, the first preset operation on the first content displayed on the display interface, the first processing unit 402 displays the prompt information of the second content associated with the first content.

For example, the first processing unit 402 may be configured to: if it is determined that the first operation instruction is to perform, by the user, the first preset operation on the first content displayed on the display interface, determine, according to an application package file, the second content that has the association relationship with the first content, and display the prompt information of the second content, where the application package file is a source file of the first content and the second content.

Figure 6:
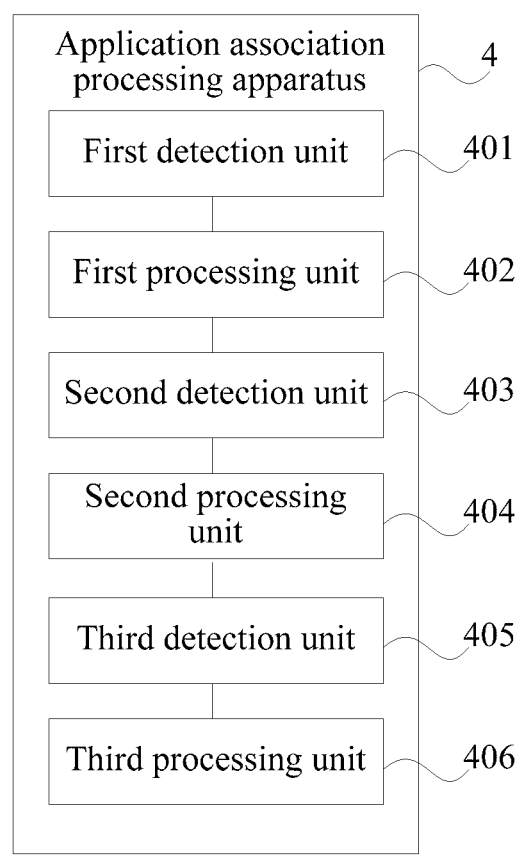
FIG. 6 is a schematic structural diagram of an embodiment of still another application association processing apparatus according to the present invention.

Further, FIG. 6 is a schematic structural diagram of an embodiment of still another application association processing apparatus according to the present invention. As shown in FIG. 6, the application association processing apparatus 4 further includes:

a third detection unit 405, configured to detect a third operation instruction entered by the user; and a third processing unit 406, configured to: when it is determined that the third operation instruction is to perform, by the user, a third preset operation on the displayed prompt information of the second content, display the second content on the display interface, where the third preset operation is an operation gesture preset for displaying the second content.

The third preset operation may be at least one tap operation on the second content, for example, a tap or double-tap operation or the like.

It should be noted that the third preset operation has been described by using an example in the foregoing embodiments, and details are not described herein again.

The application association processing apparatus 4 may work by using the methods provided by the foregoing embodiments, and details are not described herein again.

This embodiment of the present invention provides an application association processing apparatus. The application association processing apparatus detects a first operation instruction entered by a user; and when it is determined that the first operation instruction is to perform, by the user, a first preset operation on first content displayed on a display interface, displays prompt information of second content associated with the first content, where the first preset operation is an operation gesture preset by the user, and the prompt information is used to inform the user that an association relationship exists between the first content and the second content, where when the first content is an application icon, the second content is an icon of at least one widget included in an application corresponding to the application icon; or when the first content is an icon of a widget, the second content is an icon of an application to which the widget belongs. In this way, an association between an application icon and a widget is indicated, and prompt information is displayed, so that a user conveniently knows an association relationship between the application icon and the widget, and the user performs a further operation according to the prompt information, thereby reducing user operation complexity.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

The invention claimed is:

1. A method for displaying content, comprising:
  displaying an application icon on a screen of a mobile device, wherein the application icon corresponds to an application program installed on the mobile device;
  detecting a first gesture performed on the application icon;
  in response to detecting the first gesture, switching the application icon to an editable state, wherein the editable state corresponds to at least one of a floating state, a premode for searching for an associated widget icon, or a state where the application icon can be deleted or moved;
  detecting a second gesture while the application icon is in the editable state;
  in response to detecting the second gesture, displaying a first widget icon in a floating window, wherein the first widget icon corresponds to a first widget corresponding to the application program;
  detecting a third gesture performed on the first widget icon; and
  in response to detecting the third gesture, displaying the first widget as a first visual window on a desktop of the mobile device, wherein the first widget displays data corresponding to a first part of the application program's functionality.

2. The method of claim 1, wherein the first gesture is a pressing operation exceeding a preset duration.

3. The method of claim 1, wherein the first widget icon corresponds to a thumbnail, a partial screenshot, or a framework icon of the first widget.

4. The method of claim 1, further comprising:
determining, according to a package file of the application program, the first widget icon which corresponds to the first widget corresponding to the application program.

5. The method of claim 1, wherein the floating window further comprises a second widget icon, wherein the second widget icon corresponds to a second widget corresponding to the application program.

6. The method of claim 1, wherein opening the application program via the application icon provides full access to the application program's functionality.

7. The method of claim 1, wherein the application program is a weather forecast application and the first visual window displays a temperature of a current day.

8. A mobile device, comprising:
a processor; and
a memory coupled to the processor and having processor-executable instructions stored thereon;
wherein the processor is configured to execute the processor-executable instructions to facilitate the following being performed by the mobile device;
displaying an application icon on a screen of the mobile device, wherein the application icon corresponds to an application program installed on the mobile device;
detecting a first gesture performed on the application icon;
in response to detecting the first gesture, switching the application icon to an editable state, wherein the editable state corresponds to at least one of a floating state, a premode for searching for an associated widget icon, or a state where the application icon can be deleted or moved;
detecting a second gesture while the application icon is in the editable state;
in response to detecting the second gesture, displaying a first widget icon in a floating window, wherein the first widget icon corresponds to a first widget corresponding to the application program;
detecting a third gesture performed on the first widget icon; and
in response to detecting the third gesture, displaying the first widget as a first visual window on a desktop of the mobile device, wherein the first widget displays data corresponding to a first part of the application program's functionality.

9. The mobile device of claim 8, wherein the first gesture is a pressing operation exceeding a preset duration.

10. The mobile device of claim 8, wherein the first widget icon corresponds to a thumbnail, a partial screenshot, or a framework icon of the first widget.

11. The mobile device of claim 8, wherein the processor is further configured to execute the processor-executable instructions to facilitate the following being performed by the mobile device:
determining, according to a package file of the application program, the first widget icon which corresponds to the first widget corresponding to the application program.

12. The mobile device of claim 8, wherein the floating window further comprises a second widget icon, wherein the second widget icon corresponds to a second widget corresponding to the application program.

13. The mobile device of claim 8, wherein opening the application program via the application icon provides full access to the application program's functionality.

14. The mobile device of claim 8, wherein the application program is a weather forecast application and the first visual window displays a temperature of a current day.

15. A non-transitory computer-readable storage medium having processor-executable instructions stored thereon, wherein the processor-executable instructions, when executed, facilitate:
displaying an application icon on a screen of a mobile device, wherein the application icon corresponds to an application program installed on the mobile device;
detecting a first gesture performed on the application icon;
in response to detecting the first gesture, switching the application icon to an editable state, wherein the editable state corresponds to at least one of a floating state, a premode for searching for an associated widget icon, or a state where the application icon can be deleted or moved;
detecting a second gesture while the application icon is in the editable state;
in response to detecting the second gesture, displaying a first widget icon in a floating window, wherein the first widget icon corresponds to a first widget corresponding to the application program;
detecting a third gesture performed on the first widget icon; and
in response to detecting the third gesture, displaying the first widget as a first visual window on a desktop of the mobile device, wherein the first widget displays data corresponding to a first part of the application program's functionality.

16. The non-transitory computer-readable storage medium of claim 15, wherein the first gesture is a pressing operation exceeding a preset duration.

17. The non-transitory computer-readable storage medium of claim 15, wherein the first widget icon corresponds to a thumbnail, a partial screenshot, or a framework icon of the first widget.

18. The non-transitory computer-readable storage medium of claim 15, wherein the processor-executable instructions, when executed, further facilitate:
determining, according to a package file of the application program, the first widget icon which corresponds to the first widget corresponding to the application program.

19. The non-transitory computer-readable storage medium of claim 15, wherein the floating window further comprises a second widget icon, wherein the second widget icon corresponds to a second widget corresponding to the application program.

20. The non-transitory computer-readable storage medium of claim 15, wherein opening the application program via the application icon provides full access to the application program's functionality.

* * * * *

UNITED STATES PATENT AND TRADEMARK OFFICE
CERTIFICATE OF CORRECTION

| | | |
|---|---|---|
| PATENT NO. | : 11,604,560 B2 | Page 1 of 1 |
| APPLICATION NO. | : 17/587839 | |
| DATED | : March 14, 2023 | |
| INVENTOR(S) | : Yue et al. | |

It is certified that error appears in the above-identified patent and that said Letters Patent is hereby corrected as shown below:

On the Title Page

Page 2: Foreign Patent Documents, Left-Hand Column, Line 5: "CN 1030675 A 4/2013" should read -- CN 103067577 A 4/2013 --.

Signed and Sealed this
Twentieth Day of June, 2023

Katherine Kelly Vidal
*Director of the United States Patent and Trademark Office*